United States Patent [19]

Piret et al.

[11] 4,127,639

[45] Nov. 28, 1978

[54] PROCESS FOR RECOVERING SILVER FROM RESIDUES CONTAINING SILVER AND LEAD

[75] Inventors: Norbert L. Piret; Wilhelm Roever, both of Duisburg, Germany

[73] Assignee: Duisburger Kupferhütte, Duisburg, Germany

[21] Appl. No.: 695,220

[22] Filed: Jun. 11, 1976

[30] Foreign Application Priority Data

Jun. 28, 1975 [DE] Fed. Rep. of Germany ....... 2528989

[51] Int. Cl.² .......................................... C22B 11/06
[52] U.S. Cl. ..................................... 423/42; 75/108;
 75/114; 75/117; 75/118 R; 75/120; 423/39; 423/92; 423/101; 423/140; 423/561 R; 423/48
[58] Field of Search ..................... 75/108, 118 R, 120, 75/117, 114; 423/39, 42, 48, 92, 101, 140, 561

[56] References Cited

U.S. PATENT DOCUMENTS

| 295,887 | 3/1884 | Russell ............................. 75/118 R |
| 561,544 | 6/1896 | Dewey .............................. 75/118 R |
| 900,452 | 10/1908 | Wadhams et al. ................. 75/118 R |
| 3,969,107 | 7/1976 | Lippert et al. .................... 75/114 X |

OTHER PUBLICATIONS

Handbook of Chemistry and Physics, 1973–1974, pp. B-102, 135 and 232.

*Primary Examiner*—G. Ozaki
*Attorney, Agent, or Firm*—Sprung, Felfe, Horn, Lynch & Kramer

[57] ABSTRACT

Aqueous lead solutions obtained by hot chloride leaching of residues containing lead and silver ore are subjected to selective precipitation of the silver as silver sulphide, with e.g. hydrogen sulphide. The silver can then be recovered in a known manner. Lead can be precipitated from the remaining solution as a basic salt also in a known manner. If the initial residue contains copper, it is also precipitated as sulphide. The copper sulphide can be separated from the precipitate by selectively dissolving the copper with sulphuric acid under an elevated oxygen pressure. Elemental sulphur is formed and the silver sulphide can be separated from the elemental sulphur in a known manner.

15 Claims, No Drawings

PROCESS FOR RECOVERING SILVER FROM RESIDUES CONTAINING SILVER AND LEAD

BACKGROUND

The present invention concerns a process for recovering silver from lead solutions containing silver and, optionally copper and zinc, which lead solutions are obtained by means of hot chloride leaching with, for example, brine, with or, without chlorine being introduced; that is to say, the lead solutions are obtained from residues including flue dusts containing lead and silver and possibly copper, zinc, and iron.

In chemically working up lead-bearing complex concentrates in the wet way, there are obtained, as a rule, residues containing lead as their chief constituent. In most of these residues, in which the lead is often present as lead sulphate, there are contained varying amounts of silver the recovery of which is a precondition for working up the complex concentrates economically. Besides silver, there can also be present considerable amounts of other non-ferrous metals such as, for example, copper and zinc. The residues under consideration are leaching residues from the working up of the above-mentioned complex concentrates by means of, for example, sulphatizing chlorinating roasting or dead roasting, or by means of direct pressure leaching with or without a prior activation step.

In chemically working up zinc concentrates in the wet way by means of dead roasting and leaching, there are known to be obtained residues containing, besides zinc as their chief constituent, varying amounts of lead and silver, the so-called ZES (zinc electrolyis sludges). In the more recent processes — jarosite and goethite processes — the bulk of the lead and the silver remains in a silver-bearing lead sulphate leaching residue.

Furthermore, these are obtained in the pyrometallurgical working up flue dusts often containing lead and silver. In these flue dusts the lead is usually present as lead chloride.

For the purpose of recovering the silver and the lead from the above-mentioned and similar starting materials, which, with regard to the order of magnitude, may contain 2 to 25, preferably 10 to 25% Pb and 30 to 1000, preferably 300 to 1000 g/t Ag and differing amounts of copper, zinc, cadmium, and other accompanying metals, it is known to subject these materials to leaching with chloride solutions, preferably with a hot acid sodium chloride solution. Salts, which are difficult to dissolve, such as, for example, lead sulphate and silver chloride, are dissolved as chlorocomplexes. With a chloride content in the solution of $> 150$ g/l, there can be obtained $> 30$ g pb/l and about 2 g Ag/l.

As is well known, it is necessary for the oxidation potential to be increased by means of chlorine gas being added, for example, if the non-ferrous metal content, not yet oxidized, is to be oxidized.

In this process, such minor constituents as copper, zinc, and cadmium are partially or completely dissolved, too. However, ferrites as might be present will not be dissolved, so that from starting materials with larger amounts of copper and/or of zinc fixed as ferrites (for example, the zinc in ZES*), high yields are obtained only of the lead and the silver.

\* = residues from electrolytic zinc plants

As is also well known, the sodium chloride solution can be used again subsequent to the non-ferrous metals, dissolved in it, having been precipitated, in doing which the precipitation of the metals is effected by means of cooling the solution, by means of cementation processes or by means of precipitation with alkali or alkaline earth compounds, preferably with soda or lime.

By means of cementation of the lead solution with iron, there is obtained cement lead containing silver and, as the case may be, copper, with the tendency of the cement lead to cake together, however, causing technical difficulties in discharging the cementate from the reactors, for example.

In precipitating the lead with the aid of alkaline agents preferably with the aid of lime for economical reasons, there is obtained a basic lead chloride, also containing the silver and the copper, precipitated simultaneously. The lead, the silver, and the copper are jointly precipitated as basic carbonates in the same manner during precipitation with soda. The further treatment of these precipitates in accordance with well-known processes, such as, for example, fusion reduction to base bullion (subsequent, if need be, to a dechlorinating step) requires further refining for the purpose of separating the lead, the silver, and the copper, which is a further considerable burden to the economy of the recovery of the individual metals.

THE INVENTION

The process according to the present invention is a process for enriching silver from aqueous lead solutions, containing silver and, if occasion arises, copper and zinc, which lead solutions were obtained by means of hot chloride leaching with brine, for example, with or without chloride being introduced. Such lead solutions may be obtained from residues including flue dusts, containing, besides lead, silver and, optionally at least one of copper, zinc, and iron. The process does not have the above-mentioned defects, and, thus, it represents a technical and an economical advance. It is characterized by the silver being separated from the remaining metals, possibly together with the copper, as sulphide or sulphides by means of selective precipitation, with the lead subsequently being precipitated in the known manner as a basic salt, for example, by means of alkali or alkaline earth precipitants, such as, e.g. sodium carbonate or calcium carbonate. The selective precipitation of the silver, and, as the case may be, of the copper is effected at a temperature of 60°–100° C, preferably at 70°–90° C, and at a pH value of $\leq 2$, i.e., less than about 2, with hydrogen sulphide gas or with water-soluble sulphides such as, for example, sodium sulphide. By means of this selective sulphide precipitation, over 98% of the silver and, simultaneously, only $< 1\%$ of the lead in solution are precipitated from the lead solution with a high lead content and a relatively low silver content. Over 98% of the copper in solution is also precipitated in the form of sulphide. The zinc, the iron, and the cadmium are not simultaneously precipitated at a pH value of $\leq 2$.

If there is in the sodium chloride solution a ratio, for example, of (Ag + Cu) : Pb = 1 : 70, there will be effected in the sulphide precipitate a ratio of (Ag + Cu) : Pb = 24 : 1, which is equivalent to enriching the valuable metals by 1, 680.

The sulphide precipitate, obtained in this process, is rich in silver; if the precipitate is free of copper, it is subjected to further treatment for recovery of silver in a known manner, e.g. by means of an oxidizing roasting to eliminate the sulphur and by subsequent smelting. If, however, the precipitate contains copper, the silver content is further increased by an additional removal of the copper in accordance with the following. The silver-copper sulphide precipitate is subjected to oxidizing pressure (oxygen pressure of 10 to 20 atmospheres absolute) leaching with sulphuric acid, with the copper sulphide reacting to form copper sulfate and elemental sulphur. The resulting silver sulphide residue, containing elemental sulphur, is subjected to further treatment for recovery of silver in a known manner, e.g. as described above. If there is in the sodium chloride solution a ratio, for example, of Ag : (Pb + Cu) = 1 : 200, there will be effected in the silver sulphide residue a ratio of Ag : (Pb + Cu) = 7 : 1, which is equivalent to enriching the silver by 1,400.

The lead can be separated from the lead solution remaining after separation of the precipitated sulphides by, e.g. treating of the brine solution containing lead chloride with sodium or calcium carbonate, filtering off the precipitate containing the lead in form of lead oxychloride and lead carbonate. The filtrate can be recycled to the hot chloride leaching step with brine.

EXAMPLE

The process in accordance with the present invention is illustrated by the following example without being limited to the type of residue chosen, to the specified amounts contained in the lead solution, to the temperature chosen, or to the kind of sulphide precipitant used.

There was to be worked up a so-called lead solution, containing 20 g Pb/l 0.1 g Ag/l, 0.2 g Cu/l and 0.5 g Zn/l as well as 260 g NaCl/l, there being a ratio by weight of (Ag + Cu) : (Pb + Zn) = 1 : 68. The solution was an aqueous solution solution obtained by leaching of a residue containing lead as sulphate and minor contents of Ag, Cu, and Zn in a brine solution. Consequently, the Pb, Ag, Cu, and Zn were extracted in the form of chlorides.

10 l of this lead solution with a pH value of 2 had a 10% sodium sulphate solution added to it a temperature of 75° C, with the solution being stirred slowly and the pH value being maintained constant by means of adding drops of hydrochloric acid. There was added so much sodium sulphide solution that the amount of sodium sulphide, related to Ag and Cu, was equivalent to 1.5 times the stoichiometric value. Subsequently, the suspension was subjected to a further 15 - 30 minutes of stirring.

Then the precipitate was filtered and washed, with washing being effected at first with a hot acid 25% sodium chloride solution, then with water; subsequently, there were obtained 5.05 g of residue in the dry state with 19.7% Ag being equivalent to 99%,
38.8% Cu being equivalent to 98%, and
2.5% Pb being equivalent to 0.1% of the amounts originally contained in the solution.

There were in the precipitate only traces of the zinc amounting to 0.1%. In the precipitate, the ratio of weight of the valuable metals Ag + Cu to the lead precipitated simultaneously amounted to 23.5 : 1, the enrichment factor of the metals Ag + Cu, as compared with the simultaneous precipitation of the silver, the lead, the copper, and the zinc, amounting about 1,600.

This precipitate was subjected in the form of an aqueous suspension (75 g/l) to pressure leaching at 110° C and at a partial pressure of oxygen of 10 atmospheres above atmospheric pressure for 3 hours, with sulphuric acid being added (50 g/l, equivalent to a stoichiometry of about 110%, related to the Cu).

There has been added to the starting suspension 3 g/l of iron as sulphate for the purpose of preventing any oxidation of the sulphide sulphur to sulphate.

The residue, having been filtered, the solution contained over 99% of the copper, while the only chief constituents in the residue were silver sulphide and elemental sulphur. In this residue the ratio of weight of the silver to the remaining (Cu + Pb) amounted to 6.8 : 1. Compared with a simultaneous precipitation of the silver, the lead, the copper, and the zinc from the lead solution, where the ratio of weight of Ag : (Pb + Cu + Zn) was equivalent to 1 : 207, the enrichment factor of the silver, now obtained, amounts to 1,408.

What is claimed is:

1. A process of recovering silver from aqueous lead solutions containing silver, obtained by hot chloride leaching of residues containing lead and silver and having a chloride content of more than 150 g/l, which comprises:
   introducing sulphide into the solution for selective precipitation of the silver as silver sulphide,
   separating the precipitated silver sulphide from the lead solution and thereafter precipitating the lead as a basic salt from the lead solution.

2. Process of claim 1, wherein the aqueous lead solution contains copper, and copper is precipitated as sulphide with the silver sulphide.

3. Process of claim 2, wherein copper is selectively dissolved from the precipitate as copper sulfate with the formation of elemental sulphur from the copper sulphide, by dissolving the copper in an aqueous sulphuric acid solution at a temperature below the fusion point of elemental sulfur and under an elevated oxygen pressure.

4. Process of claim 1, wherein the aqueous lead solution contains at least one of copper, zinc, and iron.

5. Process of claim 1, wherein the precipitation is performed at 60°–100° C.

6. Process of claim 5, wherein the precipitation is performed at a pH of less than about 2 and the sulphide precipitant is at least one of hydrogen sulphide and a water-soluble sulphide.

7. Process of claim 6, wherein the aqueous lead solution contains at least one of zinc, iron, and cadmium, and the silver is selectively precipitated from said at least one of zinc, iron, and cadmium.

8. Process of claim 1, wherein the precipitation is performed at 60°–90° C.

9. Process of claim 1, wherein the precipitation is performed at a pH of less than about 2 and the sulphide precipitant is at least one of hydrogen sulphide and a water-soluble sulphide.

10. Process of claim 9, wherein the aqueous lead solution contains at least one of zinc, iron, and cadmium, and the silver is selectively prediptated from said at least one of zinc, iron and cadmium.

11. Process of claim 1, wherein in said precipitation, over 98% of the silver and less than 1% of the lead is precipitated in the first precipitation.

12. Process of claim 1, wherein the precipitation is performed at a pH of less than about 2.

13. Process of claim 1, wherein said residue contains 2 to 25% lead and 30–1000 g/t silver.

14. Process of claim 13, wherein over 98% of the silver and less than 1% of the lead in the aqueous lead solution is contained in precipitated silver sulphide.

15. Process of claim 1, wherein said residue contains 2 to 25% lead and 30–1000 g/t silver, wherein the precipitation is performed at a pH of less than about 2, wherein over 98% of the silver and less than 1% of the lead in the aqueous lead solution is contained in precipitated silver sulphide.

* * * * *